United States Patent
Luhmann et al.

(10) Patent No.: US 7,046,628 B2
(45) Date of Patent: May 16, 2006

(54) APPARATUS AND METHOD FOR JUST-IN-TIME TRANSFER OF TRANSMIT COMMANDS TO A NETWORK INTERFACE

(75) Inventors: Patrick J. Luhmann, Hillsboro, OR (US); Patrick L. Connor, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 860 days.

(21) Appl. No.: 09/963,077

(22) Filed: Sep. 24, 2001

(65) Prior Publication Data

US 2003/0058852 A1 Mar. 27, 2003

(51) Int. Cl.
*H04J 3/14* (2006.01)
*H04L 12/56* (2006.01)

(52) U.S. Cl. .................. 370/230; 370/235; 370/412; 370/429; 709/235; 710/35

(58) Field of Classification Search ............... 370/230, 370/235, 389, 392, 412, 413, 463, 428, 429; 709/250, 231, 235; 710/35, 52–57
See application file for complete search history.

(56) References Cited

U.S. PATENT DOCUMENTS

| | | |
|---|---|---|
| 5,165,021 A | 11/1992 | Wu et al. |
| 5,832,492 A | 11/1998 | Wooten |
| 5,878,028 A | 3/1999 | Roy et al. |
| 5,881,296 A * | 3/1999 | Williams et al. ............ 710/263 |
| 5,923,852 A | 7/1999 | Lee et al. |
| 6,012,121 A * | 1/2000 | Govindaraju et al. ....... 710/260 |
| 6,081,846 A | 6/2000 | Hyder et al. |
| 6,247,061 B1 | 6/2001 | Douceur et al. |
| 6,724,767 B1 * | 4/2004 | Chong et al. ............... 370/412 |
| 6,785,236 B1 * | 8/2004 | Lo et al. ..................... 370/235 |

* cited by examiner

*Primary Examiner*—Hassan Kizou
*Assistant Examiner*—Brian Roberts
(74) *Attorney, Agent, or Firm*—Kerry D. Tweet (57) ABSTRACT

A network driver provides additional transmit commands to a network interface when the number of transmit commands at the network interface falls below a specified threshold.

35 Claims, 5 Drawing Sheets

APPARATUS AND METHOD FOR JUST-IN-TIME TRANSFER OF TRANSMIT COMMANDS TO A NETWORK INTERFACE

FIELD OF THE INVENTION

The invention relates generally to networking and, more particularly, to an apparatus and method for providing transmit commands to a network interface when the number of transmit commands at the network interface falls below a threshold.

BACKGROUND OF THE INVENTION

A network interface typically couples a computer system with a network, the network interface comprising on-board circuitry or an attached peripheral card. Functions performed by the network interface include receiving packets from the network and transmitting packets from the computer system out onto the network. When packets are received, the network interface may assert one or more interrupts to indicate receipt of the packets to system components—e.g., an operating system or application programs resident on the computer system—that need the packet data. Similarly, when packets are transmitted from the computer system, the network interface may assert one or more interrupts to indicate transmission of a packet or to signal that a transmit queue is empty and ready to receive additional packets for transmission. Control of the network interface is provided by a network driver resident in a memory of the computer system, and the network driver includes an interrupt service routine (ISR) for processing the interrupts generated by the network interface.

When a packet is to be transmitted, the network driver will provide the network interface with a transmit command, and the transmit command indicates to the network interface that the identified packet is ready for transmission. One type of transmit command is a "packet descriptor" (or simply a "descriptor"). A descriptor identifies a memory location of a packet, and the network driver will assign one or more packet descriptors to each packet that is to be transmitted from the computer system.

Typically, as the network driver receives packets from the computer system's operating system and assigns descriptors thereto, the network driver immediately provides the descriptors to the network interface, regardless of the state of the network interface. The descriptors are sent to the network interface over a bus (e.g., a system bus, a peripheral bus, and the like), and each group of descriptors transmitted over the bus requires a bus transaction. Immediately sending descriptors to the network interface is an inefficient use of the bus, however, as only a relatively small number of descriptors will be transmitted to the network interface during a single bus transaction. Use of these "small" bus transactions will necessitate a large number of such transactions, thereby inhibiting use of burst data transactions and preventing the bus from achieving its maximum throughput.

Immediate transfer of descriptors to the network interface also results in packet latency. Each transmission of new descriptors to the network interface may interrupt or otherwise delay operation of the network interface, as the network interface will not be able to transmit packets while descriptors are being transferred to the network interface. Multiple transfers of a small number of new descriptors to the network interface will repeatedly interrupt operation—e.g., fetching packets identified by descriptors previously transferred to the network interface and transmitting those packets to the network—of the network interface. Such delays in transmitting packets increase packet latency and can result in unutilized bandwidth.

Interrupts generated by the network interface during packet transmission to the network may also cause packet latency. One conventional interrupt is commonly referred to as the "Transmit Complete" interrupt. The Transmit Complete interrupt is asserted each time the network interface completes transmission of a packet or packets. A function of the Transmit Complete interrupt is to initiate resource reclamation, which is carried out by the network driver's ISR or similar function. During resource reclamation, processed descriptors are recovered (there is a finite number of available descriptors) for subsequent use by the network driver. Asserting the Transmit Complete interrupt at completion of each transmit operation, however, leads to the generation of a large number of interrupts for high-speed devices. These interrupts must be processed by the network driver, which increases the overhead (e.g., processing resources) associated with interrupt handling, thereby decreasing processor efficiency and increasing packet latency.

Another conventional interrupt is the "Transmit Queue Empty" interrupt. This interrupt signals to the network driver that the network interface's transmit queue is empty and may receive additional packets for transmission. However, by the time the network driver is able to respond to this interrupt (e.g., by providing additional transmit commands), the network interface has sat idle for a period of time, which is an inefficient use of resources and introduces latencies. Algorithms have been developed to predict when the transmit queue at the network interface would be "almost" out of packets, but these algorithms have proven inaccurate and unable to improve efficiency.

DETAILED DESCRIPTION OF THE INVENTION

Figure 1:
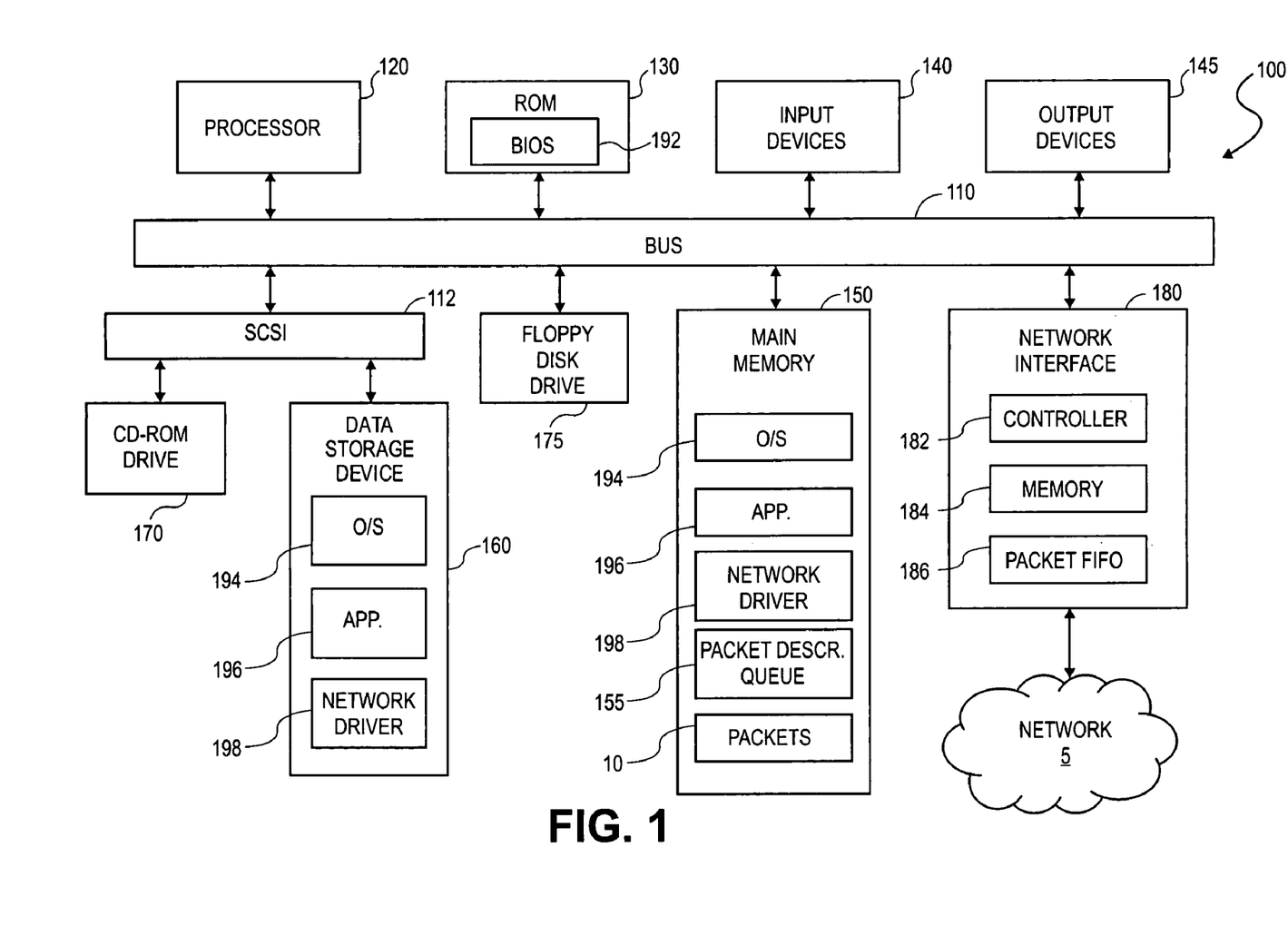
FIG. 1 shows a schematic diagram of a computer system including a network interface coupled with a network.

Embodiments of an apparatus and method for the just-in-time transfer of transmit commands to a network interface are disclosed in FIGS. 1 though 5 and the accompanying text. For clarity and ease of understanding, these embodiments are presented below in the context of a specific type of transmit command—i.e., a descriptor. It should be understood, however, that the embodiments disclosed herein are not limited to the use of descriptors and, further, that these embodiments may be practiced with any type of transmit command or other command. It should be further understood that, although the present invention is described in the context of a network interface, the present invention is generally applicable to any type of I/O controller.

Referring to FIG. 1, a system 100 includes a bus 110 having a processor 120 coupled therewith. The processor 120 may comprise any microprocessor, ASIC (application specific integrated circuit), or other suitable processing device. A read-only memory (ROM) 130, or other suitable memory, may also be coupled with the bus 110, and the ROM 130 may have a system BIOS (basis input/output system) 192 resident thereon. In addition, one or more input devices 140, as well as one or more output devices 145, may be coupled with the bus 110. Common input devices 140 include keyboards, pointing devices such as a mouse, and scanners or other data entry devices, while typical output devices 145 include video monitors, printers, and audio output devices (e.g., a sound card and/or speakers).

A main memory 150, or other suitable memory, is coupled with the bus 110, the main memory 150 comprising, for example, dynamic random access memory (DRAM). An operating system (O/S) 194 and one or more application programs 196 may be resident in the main memory 150 during operation of the system 1. One or more drivers, such as a network driver 198, may also be resident in main memory 150. In addition, one or more packets 10—at least some of the packets 10 awaiting transmission to the network 5—may be stored in the main memory 150.

The operating system 194, applications programs 196, and network driver 198 may be stored in a storage device 160, the storage device 160 comprising, for example, a hard disk drive or other suitable non-volatile memory. The storage device 160 may be coupled with the bus 110 via a Small Computer System Interface (SCSI) bus 112 (see, e.g., the SCSI-3 family of specifications). Further, the system 100 may include one or more removable memory devices. For example, a CD-ROM drive 170 may be coupled with the bus 10 via SCSI bus 112, and a floppy disk drive 175 may also be coupled with the bus 110.

The system 100 is coupled with a network 5 by a network interface 180. The network interface 180 may be coupled with any type of network 5—including the Internet, a wide area network (WAN), a metropolitan area network (MAN), or a local area network (LAN)—exhibiting any suitable network architecture. The network interface 180 may be integrated directly into the system 100 (e.g., provided by instructions and/or circuitry disposed on a motherboard). Alternatively, the network interface 180 may comprise a separately attached peripheral card, such as a network interface card (NIC). For example, the network interface 180 may comprise a PCMCIA (Personal Computer Memory Card International Association) compatible peripheral card—see, e.g., *PC Card Standard*, March 1997 Release—or a PCI (Peripheral Component Interconnect) compatible peripheral card—see, e.g., *PCI Local Bus Specification*, Revision 2.2. Further, the network interface 180 may be used with any type of media, including copper wire or other cabling, fiber optic cable, or a wireless media.

The network interface 180 provides an interface between the network 5 and the system 100. For example, the network interface 180 may receive packets 10 from main memory 150 (or other memory of system 100) and transmit the packets 10 to the network 5. Also, the network interface 180 may receive packets from the network 5 and indicate receipt—such as by asserting an interrupt—of the packet(s) to the network driver 198, as well as to the operating system 194 and applications programs 196. The network interface 180—the operation of which will be explained in detail below—may include a controller 182, a memory 184, and a transmit queue or packet FIFO (first-in-first-out) buffer 186.

The system 100 may further include a packet descriptor queue 155. The packet descriptor queue 155 may be provided in the main memory 150 or other suitable memory and may be cached in the network interface 180. When the operating system 194 provides packets 10 that are to be forwarded to the network interface 180 for subsequent transmission, the network driver 198 assigns one or more descriptors to each packet 10. The descriptors identify memory locations of the packets 10. As will be explained in greater detail below, the packet descriptor queue 155 may store descriptors (or, more generally, any suitable queue may store transmit commands) for later transfer to the network interface 180.

Figure 2:
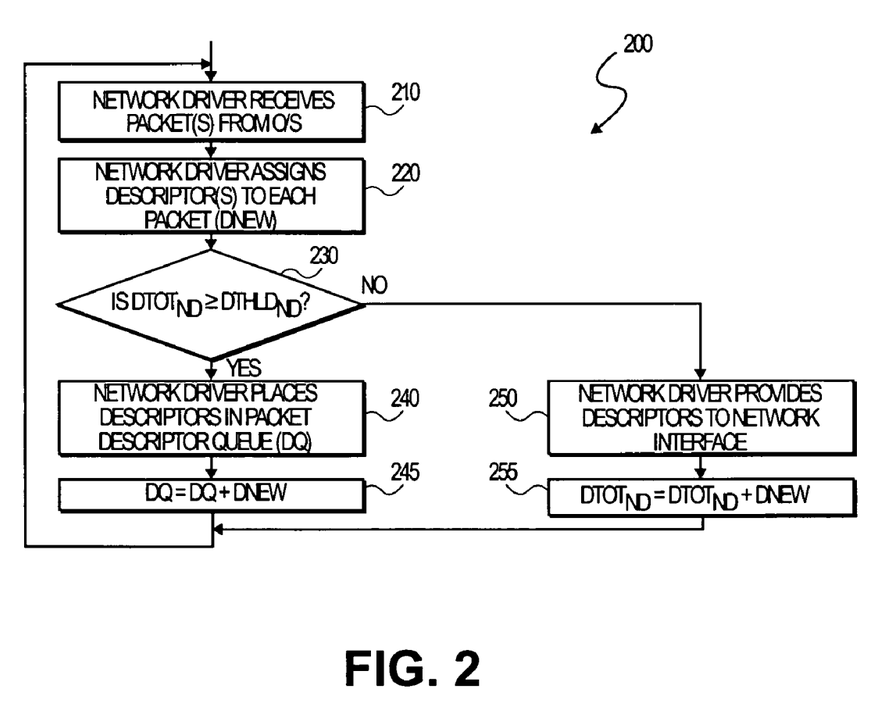
FIG. 2 illustrates a method of allocating descriptors, as may be implemented by a network driver.

Illustrated in FIG. 2 is a method 200 of allocating descriptors, as may be implemented by the network driver 198. The network driver 198 maintains a sum variable indicating the total number of descriptors at the network interface 180, this sum variable maintained by the network driver 198 being referred to herein as the "apparent" descriptor total ($DTOT_{ND}$). The network driver 198 also has a pre-defined threshold, which will be referred to herein as the "first" threshold ($DTHLD_{ND}$). If the apparent descriptor total is greater than the first threshold, the network interface 180 has a sufficient number of descriptors in-process and additional descriptors should not be provided thereto. If the number of descriptors at the network interface 180, as indicated by the apparent descriptor total, is less than the first threshold, the network interface 180 can receive additional descriptors.

Referring to reference numeral 210 in FIG. 2, the network driver 198 receives one or more packets 10—or, more generally, the network driver 198 receives data—from the operating system 194 (or from another component of system 100). As denoted at 220, the network driver 198 assigns descriptors (DNEW) to the packets 10, each of the packets 10 having one or more descriptors identifying a memory location. The apparent descriptor total ($DTOT_{ND}$) is then compared to the first threshold ($DTHLD_{ND}$)—see reference numeral 230—and, if the apparent descriptor total is greater than the first threshold, the network driver 198 places the descriptors (DNEW) in the packet descriptor queue 155, as denoted at 240, for later transmission to the network interface 180. The number of descriptors at the packet descriptor queue 155 (DQ) is then incremented by the number of descriptors (DNEW) placed therein.

Referring again to reference numeral 230, if the apparent descriptor total ($DTOT_{ND}$) is less than the first threshold ($DTHLD_{ND}$), the network driver 198 provides the descriptors (DNEW) to the network interface 180 for processing (e.g., fetching of packets 10 from main memory 150 and transmission of packets 10). The apparent descriptor total ($DTOT_{ND}$) is then incremented by the number of descriptors (DNEW) transmitted thereto from the network driver 198, as shown at 255. All other packets 10 received from the operating system 194 may be processed by the network driver 198 in an identical fashion.

Figure 3:
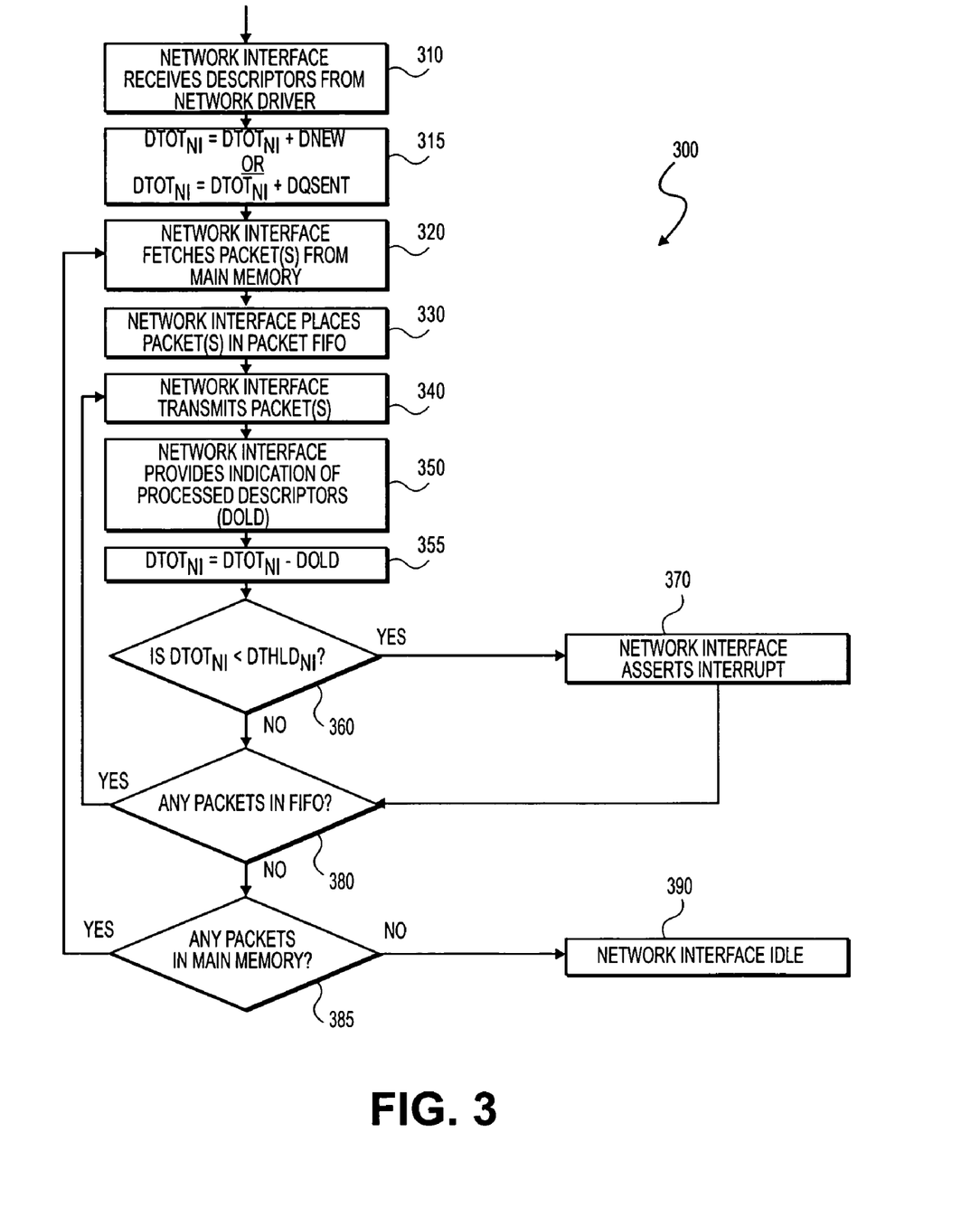
FIG. 3 illustrates a method of processing descriptors, as may be implemented at a network interface.

Shown in FIG. 3 is a method 300 of processing descriptors, as may be implemented at the network interface 180. The network interface 180 maintains a sum variable indicating the total number of descriptors at the network interface 180, and this sum variable will be referred to herein as the "actual" descriptor total ($DTOT_{NI}$). The network interface 180 also has a pre-defined threshold, which will be referred to herein as the "second" threshold ($DTHLD_{NI}$). If the actual descriptor total is less than the second threshold, the network interface 180 can receive additional descriptors. As will be explained below, the network interface 180 will indicate to the network driver 198 that it is ready to receive additional descriptors by asserting an interrupt. If the actual descriptor total is greater than the second threshold, the network interface 180 has a sufficient number of descriptors in-process and additional descriptors should not be received.

As shown at reference numeral 310 in FIG. 3, the network interface 180 may receive descriptors from the network driver 198—such as may occur when the apparent descriptor total maintained by the network driver 198 is less than the first threshold or as may occur when the actual descriptor total maintained by the network interface 180 is less than the second threshold, as will be explained below—and these descriptors may be stored in the memory 184 of network interface 180. The received descriptors (either DNEW or DQSENT) are added to the actual descriptor total ($DTOT_{NI}$), as denoted at 315.

Based upon the memory locations identified by the descriptors, the network interface 180 fetches packets 10 from the main memory 155—see reference numeral 320—and places the packets 10 in the packet FIFO 186, as shown at 330. The network interface 180 may then transmit packets 10 to the network 5, as shown at reference numeral 340. Referring to reference numeral 350, the network interface 180 may provide an indication of processed descriptors (DOLD)—i.e., those descriptors corresponding to transmitted packets—and the actual descriptor total ($DTOT_{NI}$) is decremented by the number of processed descriptors (DOLD), as denoted by 355.

The actual descriptor total ($DTOT_{NI}$) is compared to the second threshold ($DTHLD_{NI}$)—see reference numeral 360—and, if the actual descriptor total is, at any time, less than the second threshold, the controller 182 of network interface 180 will assert an interrupt—see reference numeral 370—to signal the network driver 198 that additional descriptors may be provided to the network interface 180. This interrupt, which will be referred to herein as the "Network Interface Nearly Empty" interrupt, may be asserted at the same pin or status bit as the conventional interrupts (such as, e.g., the Transmit Complete and Transmit Queue Empty interrupts). However, in contrast to the conventional interrupts, the Network Interface Nearly Empty interrupt is asserted when the number of unprocessed descriptors—i.e., those descriptors corresponding to packets awaiting transmission—at the network interface 180 falls below the second threshold. The Network Interface Nearly Empty interrupt will cause the network driver 198 to execute its ISR, as will be explained below.

The process proceeds for any remaining packets 10. If any packets 10 remain in the packet FIFO 186—see reference numeral 380—those packets are transmitted to the network 5 (see reference numeral 340) and the descriptors associated with the transmitted packets are decremented from the actual descriptor total (see reference numerals 350, 355). Likewise, if any packets 10 (for which the network interface 180 already has the descriptors) remain in main memory 150—see reference numeral 385—those packets are fetched from main memory 150 (see reference numeral 320) and placed in packet FIFO 186 (see reference numeral 330) for subsequent transmission to the network 5 (see reference numerals 340, 350, 355). If no packets 10 remain in packet FIFO 186 and, further, if no packets 10 (for which the network interface 180 already has descriptors) remain in main memory 150, the network interface 180 is idle—as shown at reference numeral 390—and will await receipt of additional descriptors.

Figure 4:
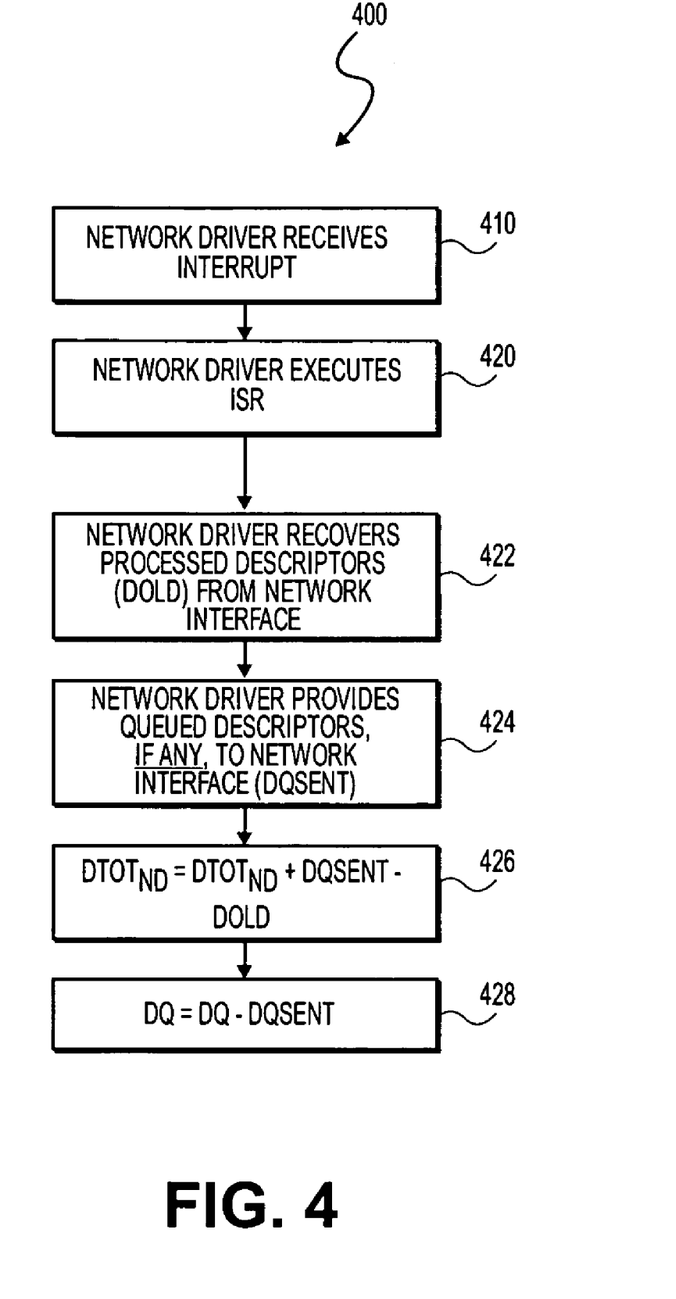
FIG. 4 illustrates a method of processing an interrupt asserted by the network interface.

Illustrated in FIG. 4 is a method 400 of processing the Network Interface Nearly Empty interrupt asserted by the network driver 180. As shown at reference numeral 410, the network driver 198 receives (or otherwise recognizes) the interrupt asserted by the network interface 180 (see FIG. 3, reference numeral 370). In response to receipt of this interrupt, the ISR of network driver 198 is executed—by, e.g., the processor 120—as denoted at reference numeral 420. During execution of the ISR, the network driver 198 recovers processed descriptors (DOLD) from the network interface 180, as shown at 422. Referring to reference numeral 424, the network driver 198 then provides some (DQSENT) of the descriptors queued (DQ) in packet descriptor queue 155 to the network interface 180. The number of queued descriptors provided to the network interface (DQSENT) in response to assertion of the Network Interface Nearly Empty interrupt may comprise all of the descriptors (DQ) currently stored in the packet descriptor queue 155 or, alternatively, a selected portion thereof. It should be understood, however, that there may not be any queued descriptors at packet descriptor queue 155 when the ISR is executed.

The apparent descriptor total ($DTOT_{ND}$) maintained by the network driver 198 is incremented by the number of queued descriptors sent (DQSENT) to the network interface 180 and is decremented by the number of processed descriptors (DOLD), as shown at 426. Also, referring to reference numeral 428, the total number of queued descriptors (DQ) in packet descriptor queue 155 is decremented by the number of descriptors sent (DQSENT) to the network interface 180. The method 400 of processing the Network Interface Nearly Empty interrupt asserted by the network interface 180 may be repeated upon each assertion of this interrupt.

Figure 5:
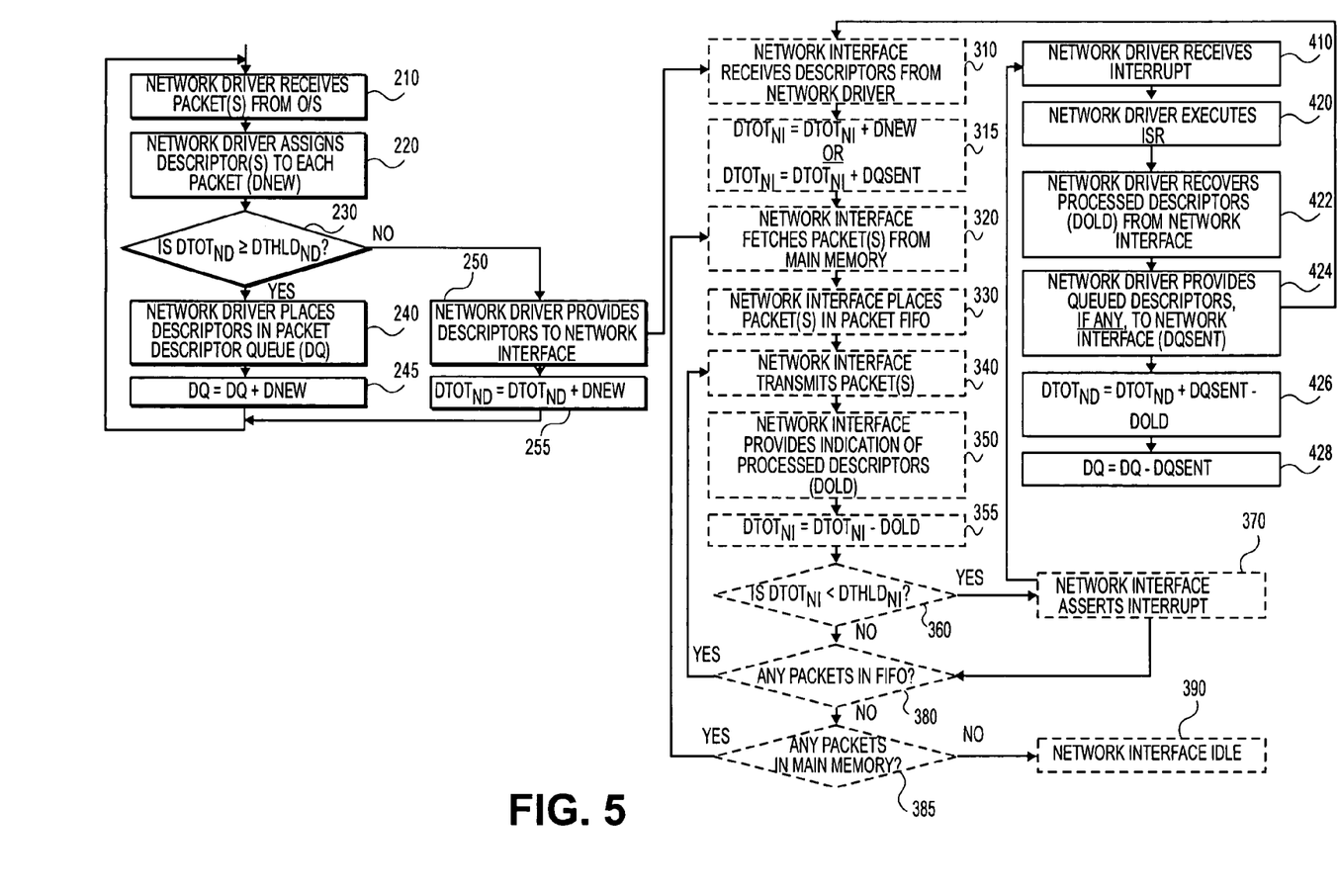
FIG. 5 shows a combined diagram illustrating the methods of FIGS. 2, 3, and 4, respectively.

The above-described methods 200, 300, 400 may be better understood with reference to the combined diagram of FIG. 5, which illustrates each of these methods as well as the interaction between the network driver 198 and network interface 180. It should be noted that, in FIG. 5, those actions performed by the network driver 198 are shown is solid line, whereas those actions performed by the network interface 180 are shown in dashed line. Also, the reference numerals of FIGS. 2, 3, and 4, respectively, are incorporated into FIG. 5.

Referring to FIG. 5, the network driver 198 may receive one or more packets 10—or, more generally, the network driver 198 may receive data—from the operating system 194 (or other component of system 100)—see reference numeral 210—and the network driver 198 assigns one or more descriptors (DNEW) to each of the packets 10, as shown at 220. Referring to reference numeral 230, if the apparent descriptor total ($DTOT_{ND}$) is greater than the first threshold ($DTHLD_{ND}$), the descriptors (DNEW) are queued in the packet descriptor queue 155, as illustrated by reference numerals 240, 245.

Referring again to reference numeral 230, if the apparent descriptor total ($DTOT_{ND}$) is less than the first threshold, the network driver 198 will provide the descriptors (DNEW) to the network interface 180, as shown at 250, 255. The network interface 180 subsequently receives the descriptors (DNEW)—see reference numerals 310, 315—and the network interface 180 will fetch the packets 10 identified by these descriptors (DNEW) from main memory 150, as shown at 320. Once a packet 10 is fetched from main memory 150, the packet 10 may be placed in the packet FIFO 186—see reference numeral 330—for transmission to the network 5 (see reference numerals 340, 350, 355). The transmission of packets 10 continues so long as packets remain in the packet FIFO 186 (see reference numeral 380). Further, the fetching of packets 10 from main memory 150, the storing these packets in packet FIFO 186, and the subsequent transmission of these packets to the network 5, respectively, continues so long as packets 10 (for which the network interface 180 has already received descriptors) remain in main memory 150 (see reference numeral 385).

If, at any time during the operation of the network interface 180, the actual descriptor total ($DTOT_{NI}$) falls below the second threshold ($DTHLD_{NI}$)—see reference numeral 360—the network interface 180 will assert the Network Interface Nearly Empty interrupt—see reference numeral 370—and, in response, the network driver 198 will execute its ISR (see reference numerals 410, 420). When the ISR is executed (see reference numerals 422, 424, 426, 428), the network driver 198 will provide all or a selected portion (DQSENT) of the descriptors queued (DQ) in packet descriptor queue 155, if any, to the network interface 180 (see reference numerals 424, 310). The network interface 180 processes these descriptors as set forth above (see reference numerals 315, 320, 330, 340, 350, 355).

The network driver 198 maintains a running total of the number of descriptors at the network interface 180, this running total being referred to as the apparent descriptor total ($DTOT_{ND}$), as noted above. The network interface 180 itself also maintains a running total of the number of descriptors that it has, this running total being referred to as the actual descriptor total ($DTOT_{NI}$), also as noted above. It should be noted that, although the apparent and actual descriptor totals provide an indication of the same property—i.e., the total number of descriptors at the network interface 180—these two variables may not necessarily be equal at a given instant in time. For example, when additional descriptors are provided to the network interface, the apparent descriptor total increments first (see FIG. 5, reference numerals 255, 426, 315), whereas the actual descriptor total decrements first (see FIG. 5, reference numerals 355, 426) when processing of descriptors is complete.

As set forth above, the network driver 198 has a threshold number of descriptors referred to as the first threshold, and the network interface 180 has a threshold number of descriptors referred to as the second threshold. In practice, the first and second thresholds will generally be substantially equivalent. However, it should be understood that the disclosed embodiments are not limited to use of identical thresholds by the network driver 198 and the network interface 180, respectively. It may be desirable, for example, to have different first and second thresholds to compensate for the fact that, at any instant in time, the actual and apparent descriptor totals may not be the same, as noted above.

During periods of low network traffic, wherein the system 100 is sending a limited number of packets (or no packets) out onto the network 5, the network interface 180 may never achieve a state where the actual descriptor total exceeds the second threshold and/or where the apparent descriptor total exceeds the first threshold. In such a circumstance, the network interface 180 and network driver 198 operate in a conventional manner. For example, each time a transmit function is complete, an interrupt will be asserted (see FIG. 5, reference numeral 370) because the actual descriptor total remains below the second threshold and, in this instance, the interrupt asserted would be analogous to the conventional Transmit Complete interrupt. Thus, during low traffic periods, the network driver 198 will immediately dump descriptors to the network interface 180—resulting in repeated interruptions of the network interface's operation—and, further, the network interface 180 will assert multiple interrupts, thereby increasing the overhead associated with interrupt processing. However, these characteristics (i.e., repeated interruptions of network interface 180 and the high overhead for interrupt processing) minimally impact the performance of system 100, as the system 100 has ample resources during low traffic periods.

During periods of high network traffic, however, the network interface 180 does not receive additional work—i.e., additional descriptors—unless the amount of work currently at the network interface 180 falls below a specified level, as measured by the first and second thresholds. Accordingly, operation of the network interface 180 is not interrupted every time the network driver 198 receives a packet from the operating system 194. Further, by asserting the Network Interface Nearly Empty interrupt any time the number of descriptors at the network interface 180 falls below this specified level (i.e., the second threshold), the network driver 198 is "warned" in advance that the network interface 180 is "nearly" out of descriptors and, therefore, the network driver 198 can provide additional descriptors (from the packet descriptor queue 155) to the network interface 180 before the network interface 180 runs out of descriptors. Thus, descriptors are provided to the network interface 180 on a "just-in-time" basis, thereby preventing unnecessary interruption of the network interface 180 but also preventing periods of delay while the network interface 180 remains idle awaiting receipt of additional descriptors from the network driver 198.

Sending descriptors—or, more generally, transmit commands—to the network interface 180 on a just-in-time basis provides a number of advantages. The network driver 198 does not repeatedly interrupt operation of the network interface 180—by immediately dumping descriptors to the network interface 180, irrespective of its state—and the use of multiple "small" bus transactions is minimized. Accordingly, a large number of descriptors may be sent to the network interface 180 in a single burst data transaction across the bus 110, thereby improving bus efficiency and minimizing packet latency. In addition, the number of interrupts asserted by the network interface 180 is reduced, as the Network Interface Nearly Empty interrupt will, during high traffic periods, be asserted only when the actual descriptor total falls below the second threshold. Thus, the overhead associated with interrupt processing in system 100 is reduced and packet latency minimized.

The foregoing detailed description and accompanying drawings are only illustrative and not restrictive. They have been provided primarily for a clear and comprehensive understanding of the present invention and no unnecessary limitations are to be understood therefrom. Numerous additions, deletions, and modifications to the embodiments described herein, as well as alternative arrangements, may be devised by those skilled in the art without departing from the spirit of the present invention and the scope of the appended claims.

What is claimed is:

1. A method comprising:
    assigning at least one descriptor to a packet;
    providing the at least one descriptor to a network interface when an apparent descriptor total is less than a first threshold number of descriptors;
    providing the at least one descriptor to a packet descriptor queue when the apparent descriptor total is greater than the first threshold; and
    receiving an interrupt generated by the network interface, the interrupt indicating that an actual descriptor total is less than a second threshold number of descriptors.

2. The method of claim 1, further comprising:
    providing a descriptor from the packet descriptor queue to the network interface in response to the interrupt.

3. The method of claim 1, the second threshold number of descriptors equivalent to the first threshold number of descriptors.

4. The method of claim 1, further comprising recovering a processed descriptor from the network interface for reuse, the processed descriptor comprising a descriptor associated with a packet transmitted by the network interface.

5. A method comprising:
receiving at least one descriptor from a network driver when an apparent descriptor total is less than a first threshold number of descriptors, the at least one descriptor associated with a packet;
transmitting the packet to a network; and
asserting an interrupt when an actual descriptor total is less than a second threshold number of descriptors.

6. The method of claim 5, further comprising receiving a descriptor from a packet descriptor queue in response to assertion of the interrupt.

7. The method of claim 5, further comprising:
identifying a processed descriptor, the processed descriptor associated with a transmitted packet; and
providing the processed descriptor to the network driver for reuse.

8. The method of claim 5, further comprising:
fetching the packet from a memory, a location of the packet in the memory identified by the at least one descriptor; and
placing the packet in a packet FIFO.

9. The method of claim 5, the second threshold number of descriptors equivalent to the first threshold number of descriptors.

10. A method comprising:
asserting an interrupt when an actual descriptor total is less than a second threshold number of descriptors;
receiving a descriptor from a packet descriptor queue in response to assertion of the interrupt; and
receiving another descriptor from a network driver when an apparent descriptor total is less than a first threshold number of descriptors.

11. The method of claim 10, the second threshold number of descriptors equivalent to the first threshold number of descriptors.

12. The method of claim 10, further comprising:
identifying a processed descriptor, the processed descriptor associated with a transmitted packet; and
providing the processed descriptor to a network driver for reuse.

13. The method of claim 10, further comprising:
fetching a packet from a memory, a location of the packet in the memory identified by the descriptor; and
placing the packet in a packet FIFO.

14. A system comprising:
a processor coupled with a bus;
a memory coupled with the bus, the memory including a packet descriptor queue;
a network interface coupled with the bus and further coupled with a network;
a network driver resident in the memory, the network driver including a set of instructions that, when executed by the processor, cause the network driver to
assign at least one descriptor to a packet;
provide the at least one descriptor to the network interface when an apparent descriptor total is less than a first threshold number of descriptors;
provide the at least one descriptor to the packet descriptor queue when the apparent descriptor total is greater than the first threshold; and
receive an interrupt from the network interface, the interrupt indicating that an actual descriptor total is less than a second threshold number of descriptors.

15. The system of claim 14, the network driver further including instructions that, when executed by the processor, cause the network driver to provide a descriptor from the packet descriptor queue to the network interface in response to the interrupt.

16. The system of claim 14, the second threshold number of descriptors equivalent to the first threshold number of descriptors.

17. The system of claim 14, the network driver further including instructions that, when executed by the processor, cause the network driver to recover a processed descriptor from the network interface for reuse, the processed descriptor comprising a descriptor associated with a packet transmitted by the network interface.

18. A system comprising:
a processor coupled with a bus;
a memory coupled with the bus, the memory including a packet descriptor queue and a network driver resident thereon;
a network interface coupled with the bus and further coupled with a network, the network interface to
receive at least one descriptor from the network driver when an apparent descriptor total is less than a first threshold number of descriptors, the at least one descriptor associated with a packet;
transmit the packet to the network; and
assert an interrupt when an actual descriptor total is less than a second threshold number of descriptors.

19. The system of claim 18, the network interface to receive a descriptor from a packet descriptor queue in response to assertion of the interrupt.

20. The system of claim 18, the network interface to identify a processed descriptor, the processed descriptor associated with a transmitted packet; and
provide the processed descriptor to the network driver for reuse.

21. The system of claim 18, the network interface to fetch the packet from the memory, a location of the packet in the memory identified by the at least one descriptor; and
place the packet in the packet FIFO.

22. The system of claim 18, the second threshold number of packets equivalent to the first threshold number of packets.

23. An article of manufacture comprising:
a machine accessible medium providing content that, when accessed by a machine, causes the machine to
assign at least one descriptor to a packet;
provide the at least one descriptor to a network interface when an apparent descriptor total is less than a first threshold number of descriptors;
provide the at least one descriptor to a packet descriptor queue when the apparent descriptor total is greater than the first threshold; and
receive an interrupt generated by the network interface, the interrupt indicating that an actual descriptor total is less than a second threshold number of descriptors.

24. The article of manufacture of claim 23, wherein the content, when accessed, further causes the machine to:
provide a descriptor from the packet descriptor queue to the network interface in response to the interrupt.

25. The article of manufacture of claim 23, the second threshold number of descriptors equivalent to the first threshold number of descriptors.

26. The article of manufacture of claim 23, wherein the content, when accessed, further causes the machine to recover a processed descriptor from the network interface for reuse, the processed descriptor comprising a descriptor associated with a packet transmitted by the network interface.

27. An article of manufacture comprising:
a machine accessible medium providing content that, when accessed by a machine, causes the machine to
receive at least one descriptor from a network driver when an apparent descriptor total is less than a first threshold number of descriptors, the at least one descriptor associated with a packet;
transmit the packet to a network; and
assert an interrupt when an actual descriptor total is less than a second threshold number of descriptors.

28. The article of manufacture of claim 27, wherein the content, when accessed, further causes the machine to receive a descriptor from a packet descriptor queue in response to assertion of the interrupt.

29. The article of manufacture of claim 27, wherein the content, when accessed, further causes the machine to:
identify a processed descriptor, the processed descriptor associated with a transmitted packet; and
provide the processed descriptor to the network driver for reuse.

30. The article of manufacture of claim 27, wherein the content, when accessed, further causes the machine to:
fetch the packet from a memory, a location of the packet in the memory identified by the at least one descriptor; and
place the packet in a packet FIFO.

31. The article of manufacture of claim 27, the second threshold number of descriptors equivalent to the first threshold number of descriptors.

32. An article of manufacture comprising:
a machine accessible medium providing content that, when accessed by a machine, causes the machine to
assert an interrupt when an actual descriptor total is less than a second threshold number of descriptors;
receive a descriptor from a packet descriptor queue in response to assertion of the rnterrupt; and
receive another descriptor from a network driver when an apparent descriptor total is less than a first threshold number of descriptors.

33. The article of manufacture of claim 32, the second threshold number of descriptors equivalent to the first threshold number of descriptors.

34. The article of manufacture of claim 32, wherein the content, when accessed, further causes the machine to:
identify a processed descriptor, the processed descriptor associated with a transmitted packet; and
provide the processed descriptor to a network driver for reuse.

35. The article of manufacture of claim 32, wherein the content, when accessed, further causes the machine to:
fetch a packet from a memory, a location of the packet in the memory identified by the descriptor; and
place the packet in a packet FIFO.

* * * * *